United States Patent
Manton

[15] 3,652,110
[45] Mar. 28, 1972

[54] FORMATION OF JOINTS BETWEEN TUBULAR MEMBERS

[72] Inventor: Douglas N. Manton, 235 Ulverley Green Road, Olton, Solihull, England

[22] Filed: Mar. 5, 1970

[21] Appl. No.: 16,817

[52] U.S. Cl............................285/328, 285/368, 285/422
[51] Int. Cl.................................................F16l 25/00
[58] Field of Search..................285/368, 412, 343, 328, 413, 285/414, 422

[56] References Cited

FOREIGN PATENTS OR APPLICATIONS

| 651,118 | 10/1962 | Canada | 285/368 |
| 1,175,126 | 11/1958 | France | 285/368 |
| 838,798 | 6/1960 | Great Britain | 285/422 |
| 223,444 | 9/1962 | Austria | 285/368 |
| 7,355 | 1894 | Great Britain | 285/368 |

*Primary Examiner*—Dave W. Arola
*Attorney*—Friedman & Goodman

[57] ABSTRACT

A fluidtight joint between a pair of aligned pipes is effected by the securing together of a pair of flanges mounted one on each of the pipes. Each flange is of composite form comprising a rigid outer part and a resiliently deformable inner part which fits around the surface of the end portion of the associated tubular member. In jointing of aligned pipes the flanges are juxtaposed with the resilient inner parts registering with each other. When the outer parts of the juxtaposed flanges are urged together each inner part is compressed to effect gripping engagement thereof with the associated pipe.

9 Claims, 7 Drawing Figures

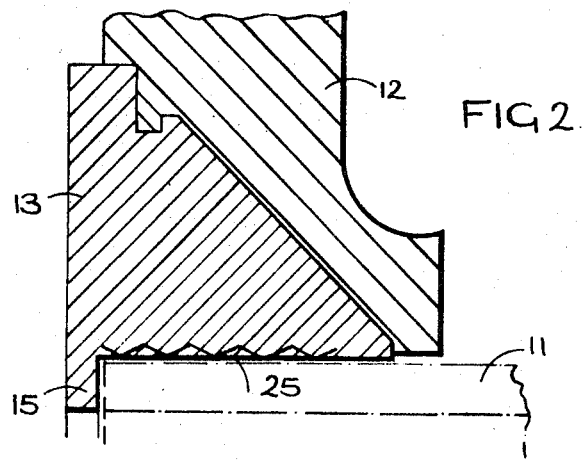
FIG. 2.
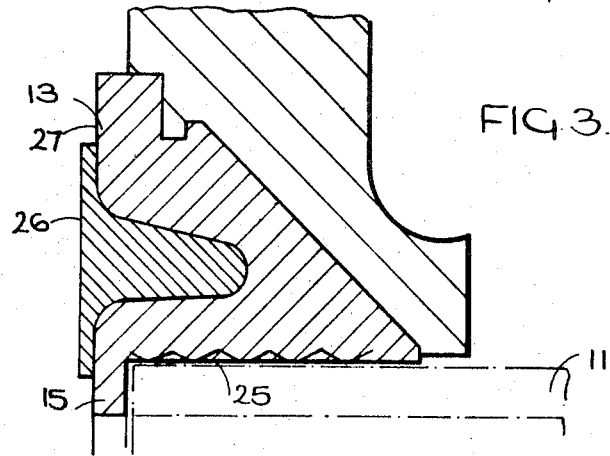
FIG. 3.
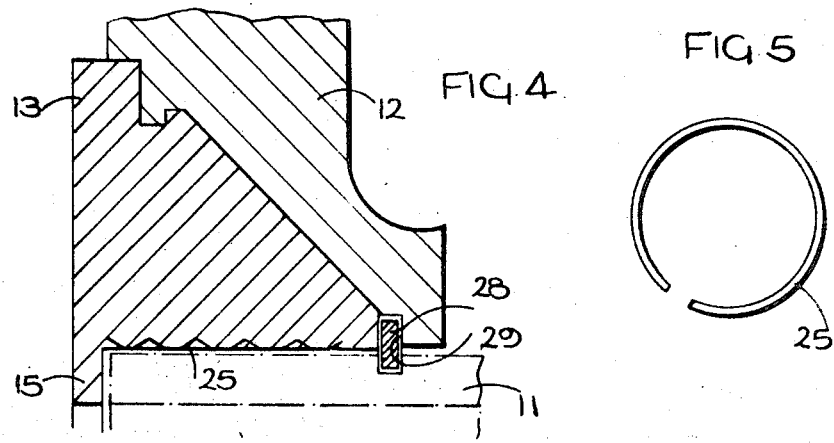
FIG. 4.
FIG. 5

FORMATION OF JOINTS BETWEEN TUBULAR MEMBERS

BACKGROUND OF THE INVENTION

1. Field of the Invention

The invention relates to the formation of joints between tubular members.

2. Description of the Prior Art

Flanged pipe joints are known. With such joints, however, it has been necessary to permanently secure the inner periphery of each flange to the outer surface of the associated pipe by welding, brazing, soldering or other like methods.

It is accordingly an object of the present invention to provide a method of forming a fluid-tight joint between a pair of tubular members.

SUMMARY OF THE INVENTION

Means for jointing two tubular members together comprises composite flanges fitted one on each end of the juxtaposed ends of the tubular members. Each composite flange has a resilient inner part and a rigid outer part. These parts are shaped so that when the outer parts are urged together the inner parts are urged inwardly to grip the tubular members.

BRIEF DESCRIPTION OF THE DRAWINGS

In the drawings:

FIG. 2 is a scrap sectional view of a composite flange used in conjunction with a corrugated sleeve, FIG. 3 is a scrap sectional view similar to FIG. 2 wherein the inner part of the composite flange has a metal insert, FIG. 4 is a scrap sectional view similar to FIG. 2 in which a split ring is accommodated within a groove formed within the composite flange, FIG. 5 is a cross-sectional view of the corrugated sleeve shown in longitudinal section in FIG. 2.

As shown in FIG. 1 a flange 10 is fitted on one end of a tubular member 11 and the flange 10 is of composite construction including a rigid outer part 12 and a resiliently deformable inner part 13. The rigid outer part 12 may be of a metal such as cast iron, mild steel, or of a non-metal and is formed with a number of angularly spaced apertures 14 through which the shanks of bolts are passed for securing the flange 10 to a like composite flange on another tubular member. The inner flange part 13 can be of a synthetic plastics material, a natural or synthetic rubber or of a non-metallic material with a metallic content. As shown, the inner part 13 includes an inwardly directed lip 15 which is arranged to bear against the end face of the tubular member 11. The inner flange part 13 is of wedge-form in section and includes a frusto-conical surface 16 arranged to bear against a corresponding frusto-conical surface 17 of the outer flange part 12. The frusto-conical surface 16 faces outwardly and away from the adjacent end of the tubular member 11 whereas the frusto-conical surface 17 faces inwardly and towards said adjacent end of the tubular member 11, the arrangement being such that, with the tubular members in end to end alignment, securing of the outer flange part 12 by bolts to an outer flange part of the like flange referred to above results in the outer flange parts 12 being urged together so that, because of the inter-engagement of the surfaces 16 and 17, each inner flange part 13 is urged resiliently inwardly into gripping engagement with its associated tubular member 11. As can be seen from FIG. 1 the outer flange part 12 includes an inwardly directed abutment 18 which bears against the smaller external diameter end of the inner flange part 13 to prevent spreading of the inner flange part 13 in a direction away from the adjacent end of the tubular member 11 during the securing together of the juxtaposed flanges.

Figure 1:
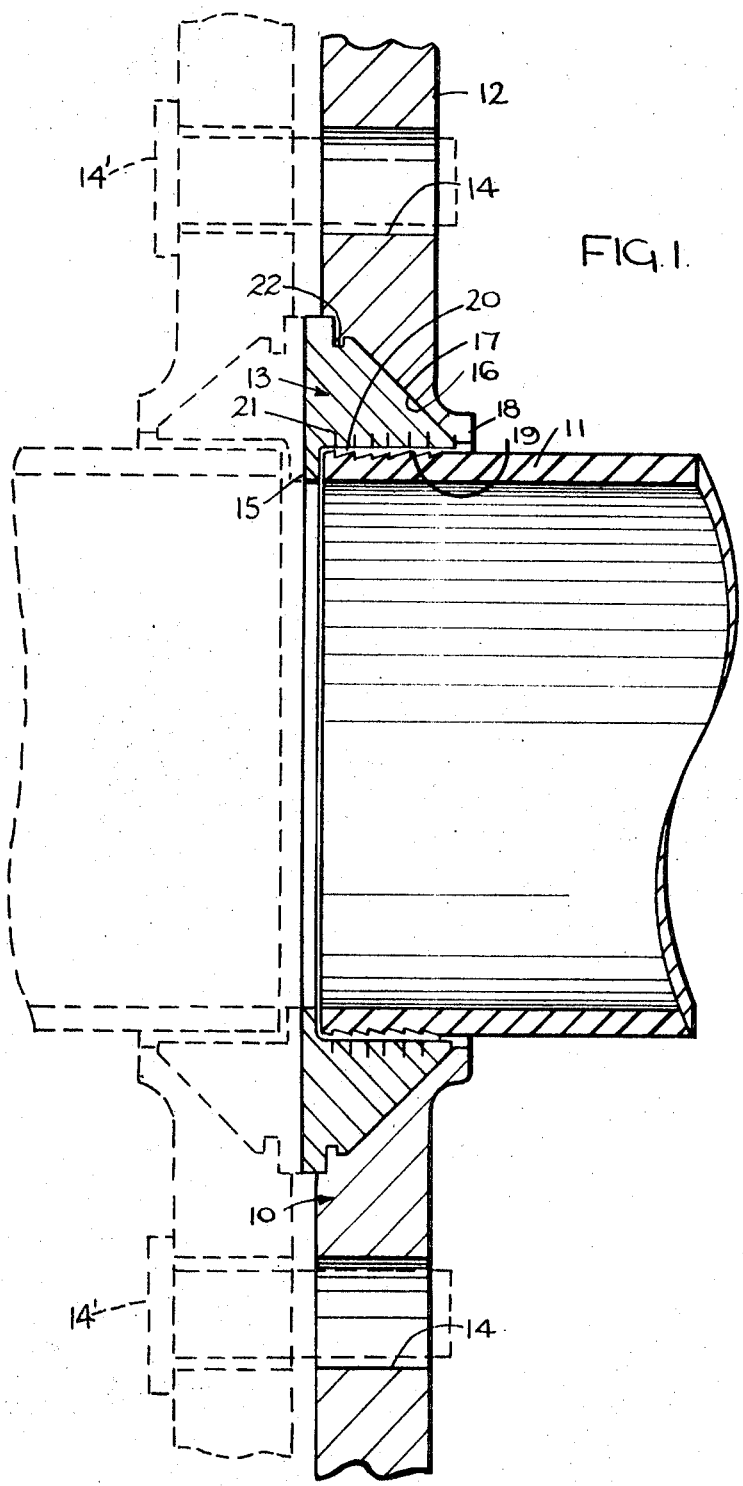
FIG. 1 is a sectional view of a composite flange fitted to the end portion of a tubular member, which tubular member may be a pipe, a connection to a filter, the inlet or outlet to a pump, storage chamber or the like and which tubular member is to be connected to a like tubular member, that is, one having the same external diameter, which like tubular member also has a like composite flange fitted to it and shown in phantom.

To increase the grip obtained between the tubular member 11 and the inner flange part 13, the outer surface of the tubular member 11 adjacent the end thereof is formed with a series of circumferentially extending grooves 19 which can be of saw-tooth form as shown in FIG. 1. The cylindrical surface 20 of the inner flange part 13, which is located in engagement with said grooved portion of the tubular member 11, is formed with a series of slots 21 to facilitate movement of the material of the inner flange part 13 into the grooves 19 of the tubular member 11.

To hold the inner flange part 13 in engagement with the outer flange part 12, a groove or channel 22 is formed in the larger external diameter portion of the inner flange part 13 and an inwardly directed tongue of the outer flange part 12 locates in said groove 22.

In use, a composite flange 10 is fitted onto the end of each tubular member to be joined, the tubular members are moved into alignment, bolts 14' are passed through the aligned apertures 14 of the outer flange parts 12 and the outer flange parts 12 are urged together by tightening said bolts or by tightening nuts onto said bolts. As can be seen from FIG. 1, the shaping of the inner flange part 13 is such that, when the two outer flange parts 12 are secured together, the portions of the two flange parts 13 which abut each other provide a seal between the two composite flanges 10 and the engagement of the material of the inner flange part 13 in the grooves of the tubular member 11 provides a pressure and fluid-tight seal between each flange and its associated tubular member.

As shown in FIG. 2, a sleeve 25 is provided between the surface of the tubular member adjacent the end thereof and the cylindrical surface of the inner part 13, said sleeve being formed with corrugations which can be circumferentially extending or helically extending as in the form of a screw-thread. As shown in FIG. 5, the sleeve 25 is formed with a longitudinally extending slit enabling the sleeve to be fitted onto the tubular member and, when the juxtaposed flanges are secured together during the making of a joint, allowing the sleeve 25 to be compressed. Compression of the inner part 13 resulting from the securing together of juxtaposed flanges causes the corrugations of the sleeve 25 to embed in the outer surface of the associated tubular member thereby creating a locking engagement to prevent lengthwise movement of the jointed tubular members relative to each other and relative to the respective associated flanges. The sleeve 25 is primarily used in the making of joints between non-metallic tubular members.

FIG. 3 shows a composite flange the inner part 13 of which has a metal insert 26 which lies proud of the inner flange part which, during the making of a joint between a pair of tubular members, registers with the inner flange part 13 of the adjacent like flange. In practice, the inner flange part of the adjacent like flange would be likewise provided with a metal insert so that, when juxtaposed flanges are secured together, the metal inserts abut thereby creating greater compression of the resilient inner flange parts 13 to enhance the gripping engagement of each inner flange part with its associated tubular member.

In circumstances wherein the compression of the resilient inner flange part 13 is likely to be of large magnitude, the tendency of the inner flange part to spread lengthwise of the tubular member 11 can be substantially eliminated by the provision of a further abutment in addition to the abutment 18 integral with the rigid outer flange part 12. FIG. 4 shows such provision, the further abutment being constituted by a ring 28 which is accommodated within an annular cavity 29 defined by aligned circumferential grooves formed in both the cylindrical surface of the inner flange part 13 and its associated tubular member 11.

Figure 6:
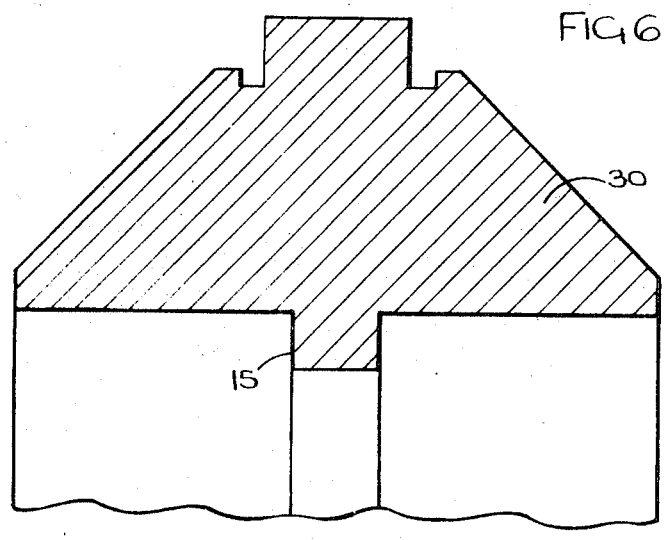
FIG. 6 is a sectional view of an integrally formed inner part for use in conjunction with two rigid outer parts and FIG. 7 is a sectional view of a compression member which can be accommodated within the communicating bores of a pair of aligned tubular members.

In FIG. 6, there is shown an inner member 30 which can, when desired, be used as a substitute for the inner parts 13 of a pair of juxtaposed flanges, said member being, in effect, the integrally formed aggregate of a pair of inner parts 13. An inner member 30 such as that shown in FIG. 6 is particularly useful when a large number of tubular members are to be joined together.

Figure 7:
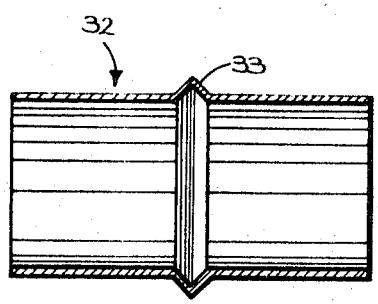

In order to adapt the method of making a joint between a pair of tubular member as hereinbefore described to the case wherein each tubular member is of flexible material and would collapse when subjected to compression, a supporting member 32, as shown in FIG. 7, can be employed to provide a reaction force of sufficient magnitude to support the compression force resulting from the inwardly-directed compression of the inner parts 13. The supporting member 32 is of greater resilience than the flexible material of the tubular members and is formed with a circumferential rib 33. In use, the member 32 is inserted into the internal bores of the tubular members to be joined together with the rib 33 interjacent the ends of the tubular members. In this application of the invention, the inner part of each composite flange would not be formed with the inwardly-directed lip 15, as shown in FIG. 1, as the function implemented by the latter would be performed by the rib 33. Thus during the securing together of juxtaposed flanges respectively fitted on each flexible tubular member, the supporting member 32 provides support for the inwardly-directed force resulting from compression of the inner parts 13 of the composite flanges, which compression force would otherwise, in the absence of the supporting member 32, cause the flexible tubular members to deform from their original shapes.

In the various examples discussed above the flanges have been bolted together.

In small bore pipeline systems, such as domestic water mains, a screw connecting means may be used, one of the flanges including a male threaded portion and the other including a female threaded portion.

I claim:

1. In jointing means for forming a joint between a pair of tubular members including a first flange for fitment on an end portion of one of the tubular members, a second flange for fitment on an end portion of the other tubular member, means for securing said flanges together with the tubular members in alignment, each flange being of composite form and including a rigid outer part and a resiliently deformable inner part, the inner and outer parts of each composite flange being provided with mating tapered surfaces which co-act to urge the associated inner part inwardly to effect gripping engagement with the end portion of the associated tubular member when the rigid outer parts of the juxtaposed composite flanges are secured together, the improvement which comprises the provision of means for enhancing gripping engagement between each inner part and its associated tubular member, said gripping-enhancing means being constituted by grooves of generally saw-tooth configuration in the surface of said end portion of each tubular member and circumferentially-extending slits in a face of the inner part engageable with said end portion.

2. In jointing means for forming a joint between a pair of tubular members including a first flange for fitment on an end portion of one of the tubular members, a second flange for fitment on an end portion of the other tubular member, means for securing said flanges together with the tubular members in alignment, each flange being of composite form and including a rigid outer part and a resiliently deformable inner part, the inner and outer parts of each composite flange being provided with mating tapered surfaces which co-act to urge the associated inner part inwardly to effect gripping engagement with the end portion of the associated tubular member when the rigid outer parts of the juxtaposed composite flanges are secured together, the improvement which comprises the provision of means for enhancing gripping engagement between each inner part and the associated tubular member, said gripping-enhancing means being constituted by a corrugated sleeve which is located between the surface of the end portion of each tubular member and a face of the inner part adjacent said surface.

3. Jointing means according to claim 2 in which the mating surfaces of the inner part and the outer part of each composite flange are constituted by a frusto-conical surface of said inner part and a frusto-conical surface of said outer part which conforms with the frusto-conical surface of the inner part.

4. Jointing means according to claim 2 in which the inner part of each composite flange has an inwardly-directed lip which is arranged to abut the end of the associated tubular member when the composite flange is fitted thereon.

5. Jointing means according to claim 2 which includes a supporting member of resilient material to inter-connect the bores of the aligned tubular members, said supporting member having an outwardly-directed rib around its outer periphery and being located with said outwardly-directed rib interjacent the ends of the aligned tubular members.

6. Jointing means according to claim 2 in which a face of the outer part of each composite flange has an abutment for restricting movement of the inner part lengthwise of the associated tubular member in a direction away from the end of said tubular member when the juxtaposed flanges are secured together.

7. Jointing means according to claim 2 in which the inner parts of the first and second flanges are integral with each other.

8. Jointing means according to claim 2 in which each inner part has a metal insert embedded therein.

9. Means for forming a joint according to claim 1 in which the inner parts of the first and second flanges are integral with each other.

* * * * *